United States Patent Office.

EDWARD L. SEYMOUR, OF NEW YORK, N. Y.

Letters Patent No. 115,243, dated May 23, 1871; antedated May 11, 1871.

IMPROVEMENT IN PREPARING AND TREATING IRON ORES IN THE MANUFACTURE OF STEEL.

*The Schedule referred to in these Letters Patent and making part of the same.*

---

I, EDWARD L. SEYMOUR, of the city, county, and State of New York, have invented a certain Process for Preparing or Treating Iron Ores, (such treatment, however, being applicable, also, to other mineral substances,) of which process the following is a specification.

My process, herein to be described, relates, chiefly, to the treatment of iron ores in a granulated or pulverized condition, and that have been, by some one of the known methods, concentrated, or, in other words, separated, so far as practicably may be, from accompanying foreign and objectionable substances not chemically combined. Other objectionable substances combined with the ore I drive off by my method of treatment, as presently explained, and then so deoxidize and metallize the ore, and, finally, further purify it, as to produce, in a granulated or pulverulent state, a material from which the finer grades of bar-iron, or, better still, of almost any (and uniform) grade of cast-steel, can be more economically produced than from the best bar-iron or the best "blistered" steel by the ordinary methods.

As directly or indirectly bearing on the merits of my new process, I may be permitted to remark, before describing it in detail, that to perfectly deoxidize iron ores in a granulated or pulverized condition (which is their necessary condition for my present mode of treatment) by means of gases, as hydrogen or carbonic oxides, for example, on any considerable scale, is impracticable.

Again, the mode of deoxidizing or metallizing iron ores, as described in the specification and constituting one of the claims of the patent issued to me on the 19th day of November, 1867, for a new method of making cast-steel and malleable iron direct from the ore, gives sufficiently correct results; but the graduation of the heat of the furnace, the regulation of the fire, and of the thickness of the layers of pulverized ore and carbon, on a large scale, requires, practically, too much skill and attention.

My present method of deoxidizing or metallizing iron ores is more simple, economical, and uniform in results, and may be said to consist of several distinct or consecutive metallurgic operations, as follows:

First, the ore is granulated or pulverized, as stated, to as fine a degree as circumstances will permit, and then "concentrated," as explained, in the most available way.

Next, as a great portion of iron ores in their natural state contains sulphur, phosphorus, arsenic, &c., I drive these off by what I term "superheating" the granulated or pulverized ore—that is, I bring it in a proper furnace, muffle, or chamber to a white heat, or a heat not less than that of the welding heat of iron, and so keep it for about an hour. This portion of the treatment not only sublimes and drives off completely (through proper vents in the muffle or chamber containing the ore) the noxious matters referred to, but by repeated test it seems to be proved that the affinity of the oxygen in and for the ore is very greatly weakened, and its affinity for the carbon, employed in the next stage of my treatment, to deoxidize and metallize it, is correspondingly enhanced.

I have used the term "superheating" the ores in contradistinction to those of "desulphurizing," "calcining," "roasting of ores," and like terms used in metallurgy to designate the usual processes, by which only a comparatively very imperfect elimination of these noxious elements can be effected.

The next step, after the ore has been heated to a sufficient degree and for a sufficient time, as stated, is to deoxidize and metallize it by discharging it suddenly, in its highly-heated state, from the heating-chamber into another chamber or receptacle containing pulverized carbon, (pulverized charcoal being preferable,) in which latter chamber there is a mechanical apparatus (of any convenient design) to rapidly stir and admix, to the most intimate contact, the particles of ore and carbon.

The oxygen in the ore and the particles of carbon unite with a sort of deflagration, as it were, (each particle of ore being separately considered,) and thus each such particle or granule is disintegrated or disaggregated, and the valuable sub-particles, so to express it, of salts of iron, &c., that are in the ore, are almost instantaneously deoxidized and metallized.

Then comes the final portion of my treatment of iron ore to prepare it for conversion into iron or steel, as set forth.

In addition to the objectionable matters before referred to that exist in many if not in most iron ores in their natural state, there are to be found small proportions of silica, alumina, and other objectionable substances that cannot, of course, be separated by any mere mechanical means, nor by heat, as will be understood; but after the disintegration of the ore particles by the treatment just above described I can rapidly and cheaply separate the metallized (iron) particles from the rest of the "stuff" after it has become sufficiently cooled to operate upon and not injure the magnets of the separator, say to 100° Fahrenheit, or less, by the aid of any well-working magnetic-ore separator, as will also be understood, and thus have a material suited to the production of almost any grade of cast-steel, superior to and of less cost than the best bar-iron or the best blistered steel as now produced.

What I claim is—

Preparing or producing the granulated or powder-like material, as described, for the making of iron and steel, by the process or series of operations set forth, namely, taking iron ore in a granulated or pulverized state, subjecting it to a high heat, in the manner and to the extent described, and then suddenly and intimately admixing it with pulverized carbon, as set forth, and for the purpose and with the results set forth, and then separating the pure metallic iron powder from the waste remainder of the disintegrated ore, as explained.

E. L. SEYMOUR.

Witnesses:
   I. A. WORMUTH,
   GEO. HADCOCK.